United States Patent [19]

Boyette

[11] 4,432,383

[45] Feb. 21, 1984

[54] ATTACHMENT FOR SAFETY VALVES

[76] Inventor: Lewis D. Boyette, P.O. Box 5492, Pensacola, Fla. 32505

[21] Appl. No.: 311,593

[22] Filed: Oct. 15, 1981

Related U.S. Application Data

[63] Continuation of Ser. No. 30,422, Apr. 16, 1979.

[51] Int. Cl.³ .......................................... F16K 17/40
[52] U.S. Cl. ...................................... 137/77; 251/67; 251/116
[58] Field of Search ............... 137/77, 75, 72; 251/67, 251/116, 115, 291, 66

[56] References Cited

U.S. PATENT DOCUMENTS

| | | | |
|---|---|---|---|
| 2,295,486 | 9/1942 | Lebus | 251/66 |
| 2,526,363 | 10/1950 | Jones | 137/75 |
| 2,950,022 | 8/1960 | Boyer | 137/72 |
| 3,015,337 | 1/1962 | Hookway | 137/75 |
| 3,180,524 | 4/1965 | Shepard et al. | 137/72 |
| 3,842,853 | 10/1974 | Kelly et al. | 137/72 |

Primary Examiner—A. Michael Chambers
Attorney, Agent, or Firm—Kelly O. Corley

[57] ABSTRACT

A restraining block engages the valve stem of a safety valve, holding the valve open. The block is selectively rotatable within an auxiliary housing from a locked to a released position wherein both block and stem are free to move along the stem axis, permitting the valve to close.

2 Claims, 6 Drawing Figures

ATTACHMENT FOR SAFETY VALVES

This is a continuation, of application Ser. No. 30,422 filed Apr. 16, 1979.

The invention relates to the art of controlling safety valves.

Safety valves for such applications as oil or gas wells are normally held open by a cap screwed onto the valve main housing and restraining the valve stem from axial movement. It is known to provide such a cap with a heat responsive means for releasing and permitting the valve to close in response to excessive heat, as in Kelly U.S. Pat. No. 3,842,853. However, in the case of other emergency conditions, it is necessary to manually unscrew and thus remove the cap, often at considerable physical danger to personnel. Furthermore, under emergency conditions, the valve stem may exert very large pressures against the restraining cap, making manual removal of the cap quite difficult.

These and other difficulties with prior art constructions are avoided by the present invention, as will be set forth below.

According to a major aspect of the invention, there is provided a control apparatus for controlling a valve assembly, the assembly comprising a main housing having walls defining a passageway extending along an axis and a valve actuating stem movable within the passageway along said axis, the control apparatus comprising an auxiliary housing mountable on the main housing; restraining block means for engaging the end of the valve stem; engagement means on the block means and on the auxiliary housing for normally supporting the block means in a locked position along the axis wherein the block means prevents axial movement of the valve stem; and selectively actuatable release means for rotating the restraining block means from the locked position to a released position wherein the block means and the stem are free to move along the axis.

According to another aspect, the engagement means comprises bearing means for providing rolling contact between the restraining block means and the auxiliary housing when the block means is rotated from the locked position to the released position.

According to another aspect, the block means is in the general form of a cylinder received within a generally cylindrical bore extending along the axis in the auxiliary housing, the bearing means comprising at least one spherical ball partially received in a generally circumferentially extending groove in the bore and partially received in a generally circumferentially extending groove portion in the periphery of the cylinder, at least one of the cylinder and the cylindrical bore further comprising a third groove communicating with the circumferentially extending groove in the one of the cylinder and the cylindrical bore, the third groove permitting axial movement of the cylinder when the ball is positioned within the third groove.

According to another aspect, the block means comprises thrust bearing means for engaging the valve stem.

According to another aspect, there is further comprised means for actuating the release means in response to excessive temperature.

Other aspects will in part appear hereinafter and will in part be obvious from the following detailed description taken in connection with the accompanying drawings, in which.

Figure 2:
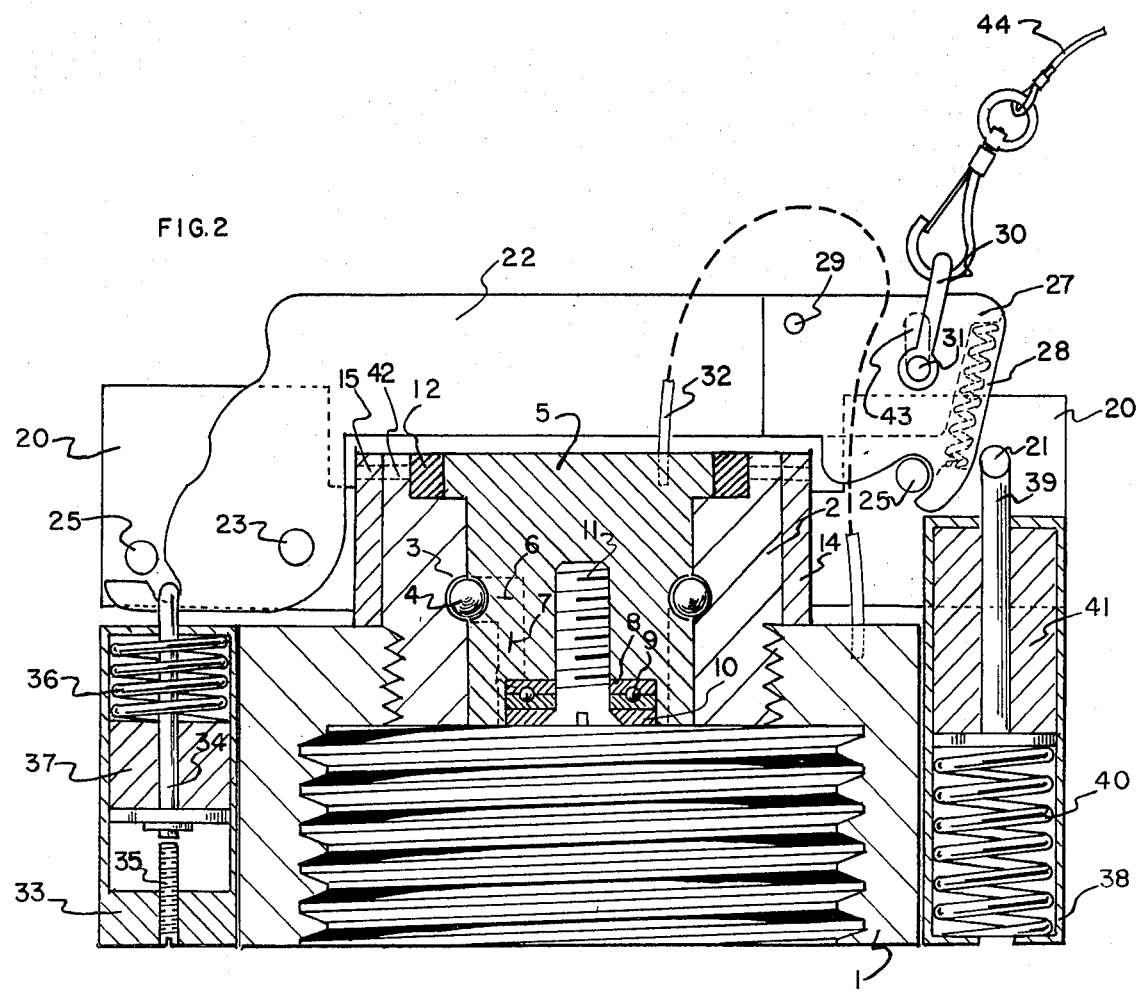
FIG. 2 is a sectional view through the center of the FIG. 1 apparatus.
Figure 3:
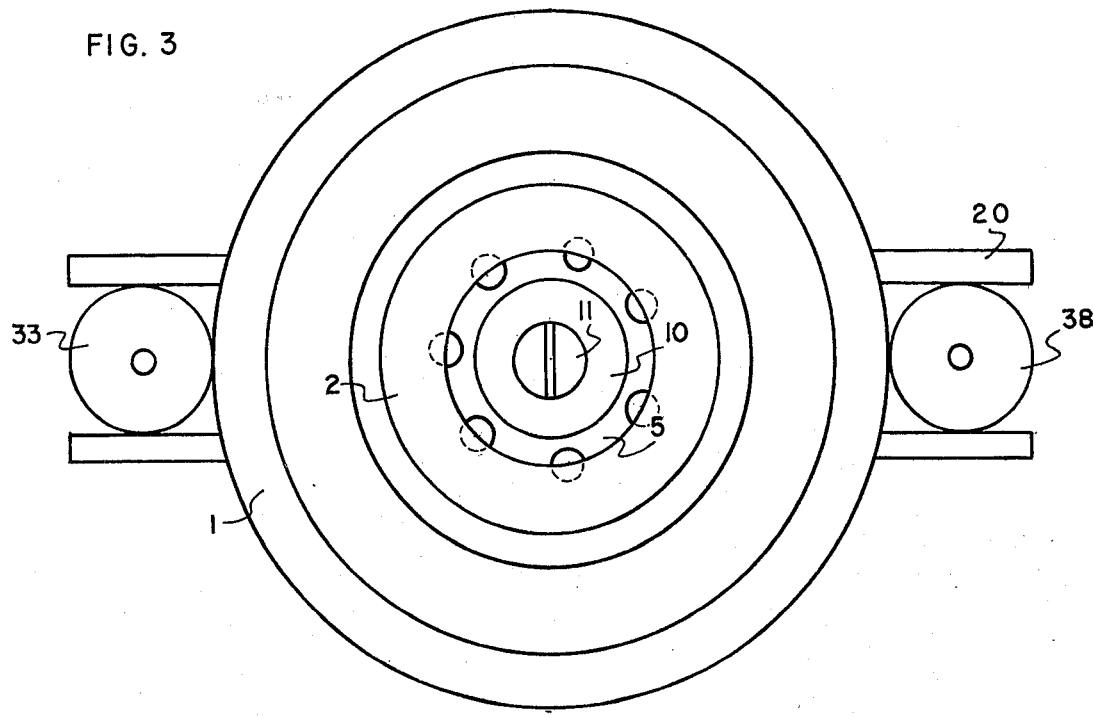
FIG. 3 is a bottom plan view of the FIG. 1 apparatus.
Figure 5:
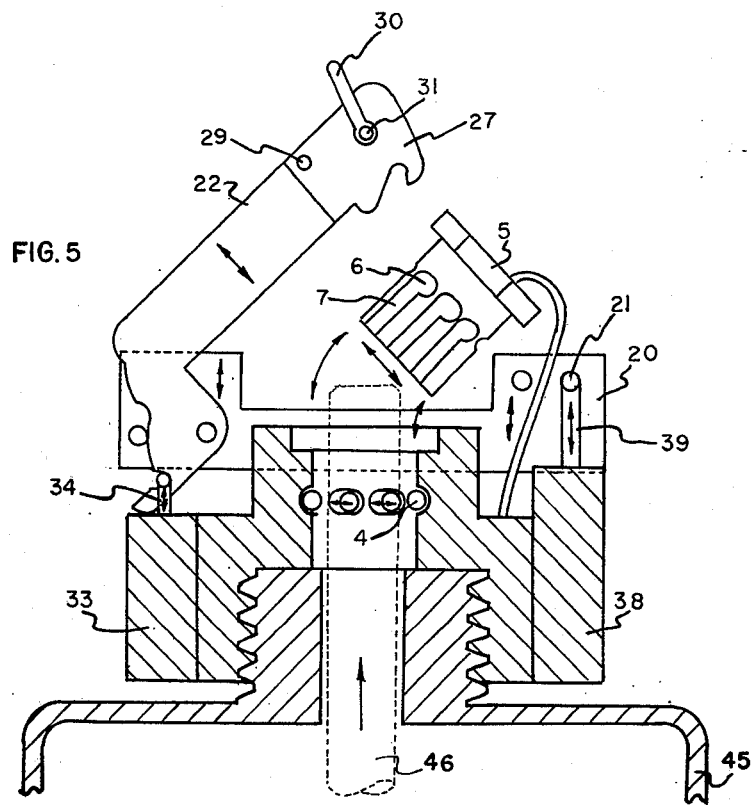
FIG. 5 is a simplified sectional view of the FIG. 1 apparatus mounted on a safety valve, illustrating release of the safety valve in response to excessive heat.
Figure 6:
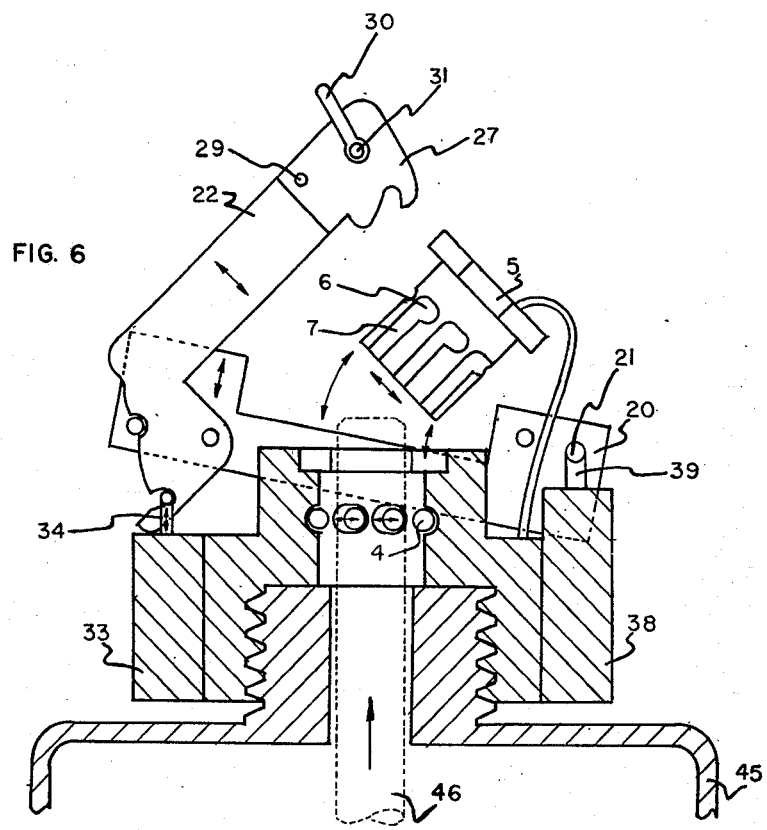
FIG. 6 is a view similar to FIG. 5, illustrating selective release of the safety valve by manual actuation of the control apparatus.

As shown in FIGS. 2, 5 and 6, the control apparatus is formed essentially of four cooperating means for controlling the safety valve. FIGS. 5 and 6 show a portion of the main housing 45 for the conventional safety valve (not illustrated). Main housing 45 includes walls defining a passageway extending along an axis. Valve actuating stem 46 is positioned within the passageway and, when stem 46 moves axially as indicated by the arrows in FIGS. 5 and 6, closes the valve. The present control apparatus normally prevents such axial movement of stem 46, thus holding the valve open, as will be set forth below.

The first of the four cooperating means according to the invention is an auxiliary housing or frame, illustrated in FIG. 2 as ring 1 mounted by threads on main housing 45, a further ring 2 being threadedly mounted on ring 1. As shown in FIGS. 5 and 6 rings 1 and 2 may be integral, and in effect form an extension of the axial passageway in housing 45 through which stem 46 must move in order to permit the safety valve to close.

The second cooperating means comprises restraining block 5 for engaging the end of stem 46. Block 5 is preferably in the general form of a cylinder received within a matching generally cylindrical bore in ring 2, the bore extending coaxially along the axis of stem 46.

The third cooperating means is engagement means on housing ring 2 and on block 5 for normally supporting block 5 in a locked position along the axis of stem 46, whereby block 5 prevents axial movement of stem 46.

The preferred and illustrated form of engagement means comprises at least one (preferably a plurality) ball 4 partially received in a generally circumferentially extending groove 3 in the cylindrical bore in ring 2, and partially received in generally circumferentially extending groove 6 in the periphery of cylindrical block 5. When balls 4 are in grooves 3 and 6, block 5 is in the locked position, and axial movement of block 5 and accordingly of stem 46 are prevented, holding the valve open. Balls 4 within grooves 3 and 6 provide rolling contact when block 5 is rotated about its axis, as set forth below.

The forth cooperating means is a selectable release means for rotating block 5 from the locked position described above to a released position wherein block 5 and stem 46 are free to move along the axis of stem 46, thus permitting the valve to close. The preferred means for performing this function comprises provision of an additional groove 7 for each ball 4; each groove 7 permitting axial movement of block 5 when its associated ball 4 is received therein. Grooves 7 may be provided, as illustrated, in the exterior of block 5, extending from the end of block 5 contacting stem 46 to and communicating with grooves 6. Alternatively, grooves 7 may be provided in the cylindrical bore of ring 2, extending from the end of the bore remote from stem 46 to and communicating with grooves 3.

The outer end of the preferred block 5 is in the form of a hexagon received by a mating hexagonal inner surface in ring 12, the latter being received in an annular groove in the end of the cylindrical bore remote from stem 46. Ring 12 is axially located by guide pins 13 (FIG. 4) extending through circumferentially extending slots 42 (FIG. 2) formed near the end of ring 2 remote from stem 46. Pins 13 in slots 42 permit, ring 12 and block 5 to rotate about their mutual axis sufficiently for balls 4 to move to the ends of grooves 6 and enter grooves 7.

Figure 1:
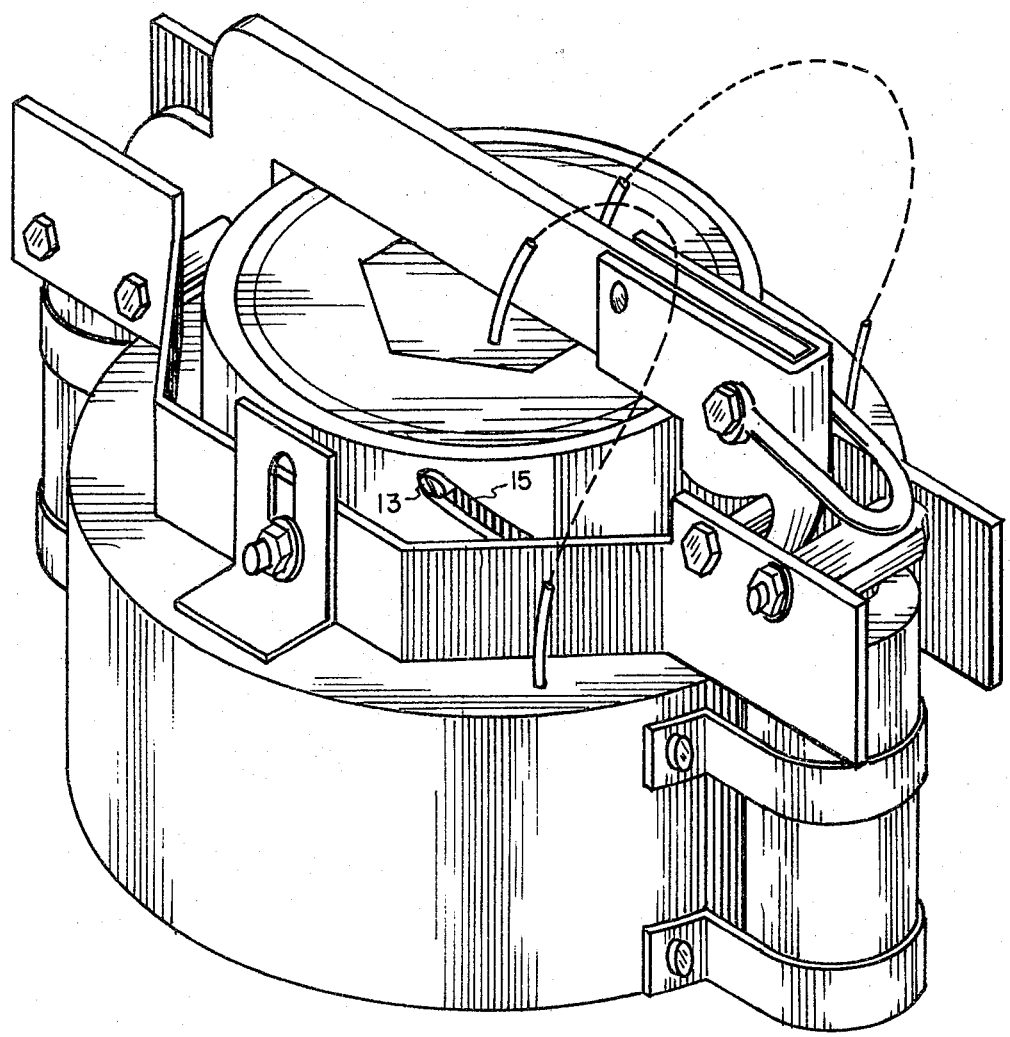
FIG. 1 is an isometric view of the preferred control apparatus according to the invention.
Figure 4:
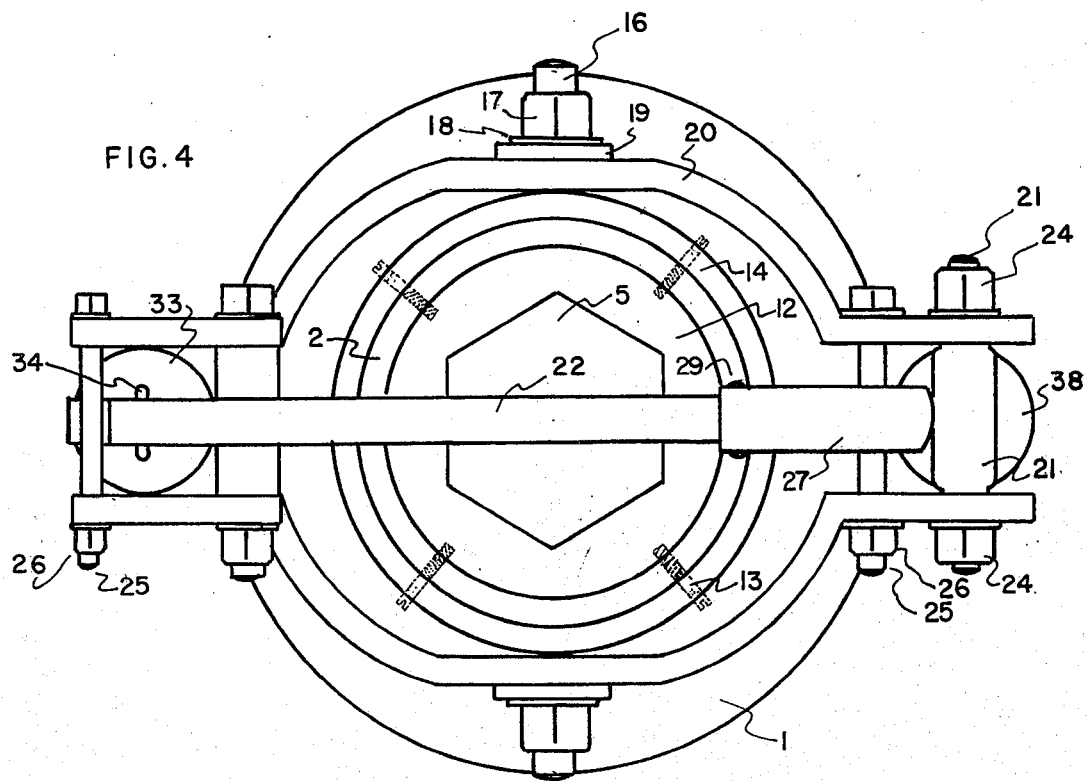
FIG. 4 is a top plan view of the FIG. 1 apparatus.

Collar 14 surrounds the outer periphery of and is coaxial with ring 2, as shown in FIGS. 2 and 4. Yoke 20 spans collar 14, and is pivotally attached thereto at its midpoint by bolts 16. As best shown in FIGS. 1, 2 and 4, the outer ends of pins 13 extend through diagonal slots 15 in collar 14. Axial movement of collar 14 away from ring 1 accordingly cams pins 13 and ring 12 counterclockwise as viewed in FIGS. 1 and 4, rotating block 5 until balls 4 enter grooves 7. Collar 14 can be driven axially by movement of either end of yoke 20 away from ring 1.

The presently preferred means to selectively actuate the release mechanism is shown in FIGS. 1, 2, 4, and 6. Lever 22 has its leftmost end as there illustrated pivotally mounted on and restrained by spring-loaded rod 34. A pivot pin 25 pivotally connects an intermediate point on lever 22 to the leftmost end of yoke 20. The rightmost end of lever 22 is normally retained via pin 25 at a fixed position by a latching mechanism, the details of which are not relevant to the present invention. When the rightmost end of lever 22 is pulled away from pin 25, as by cable 44 attached to link 30, lever 22 pivots about the upper end of rod 34. This raises pivot pin 25 and the left end of yoke 20 (FIG. 6), which, via bolts 16 (FIG. 4), raises collar 14, releasing block 5 as above described. Cable 44 can extend to a remote location so that the safety valve may be closed from a safe distance whenever desired.

As a further feature, and as illustrated in FIG. 2, a conventional thrust bearing 8, 9 and 10 may be mounted on the inner end of block 5, as by screw 11, to permit easier rotation of block 5 against the large force exerted thereagainst by stem 46.

According to another feature of the invention, means are provided for actuating a release means in response to excessive temperature. This is preferably done by suspending the rightmost end of yoke 20 via rod 39' from a spring-loaded fusible plug 41. As illustrated, excessive temperature will melt plug 41, permitting spring 40 to raise the rightmost end of yoke 20, thus raising collar 15 and releasing block 5, as shown in FIG. 5.

I claim:

1. Control apparatus for controlling a valve assembly, said assembly comprising a main housing having walls defining a passageway extending along an axis and a valve actuating stem movable within said passageway along said axis, said control apparatus comprising:
   (a) an auxiliary housing mountable on said main housing;
   (b) restraining block means for engaging the end of said valve stem;
   (c) engagement means on said block means and on said auxiliary housing for normally supporting said block means in a locked position along said axis wherein said block means prevents axial movement of said valve stem, said engagement means comprising bearing means for providing rolling contact between said restraining block means and said auxiliary housing when said block means is rotated from said locked position to said released position; and
   (d) selectively actuatable release means for rotating said restraining block means from said locked position to a released position wherein said block means and said stem are free to move along said axis;
   (e) said block means being in the general form of a cylinder received within a generally cylindrical bore extending along said axis in said auxiliary housing, said bearing means comprising at least one spherical ball partially received in a generally circumferentially extending groove in said bore and partially received in a generally circumferentially extending groove portion in the periphery of said cylinder, at least one of said cylinder and cylindrical bore further comprising a third groove communicating with said circumferentially extending groove in said one of said cylinder and said cylindrical bore, said third groove permitting axial movement of said cylinder when said ball is positioned within said third groove.

2. The control apparatus defined in claim 1, further comprising means for actuating said release means in response to excessive temperature.

* * * * *